Dec. 10, 1946. G. W. PECK 2,412,285

AIRCRAFT TRANSPORT PLANE

Filed Oct. 29, 1942

INVENTOR:
GARRETTE W. PECK
BY
ATTORNEY

Patented Dec. 10, 1946

2,412,285

UNITED STATES PATENT OFFICE 2,412,285

AIRCRAFT TRANSPORT PLANE

Garrette W. Peck, Pensacola, Fla., assignor to Howard W. Taylor, Richmond, Va.

Application October 29, 1942, Serial No. 463,829

6 Claims. (Cl. 244—5)

My invention has for an object to provide a heavier than air carrier that can transport troops, freight and heavy loads long distances, particularly in time of war, at a reasonably fast air speed and yet can be landed at speeds so low that any vacant field or body of water, or open space can be utilized as a landing field without harm to the aircraft.

The invention embraces a low aspect ratio wing plane having the middle longitudinal portion omitted to allow the passage of air through the wing, thus giving four bearing surfaces instead of the two surfaces of the conventional wing and in this manner preserve a low aspect wing ratio to the entire craft. The invention also includes a low aspect ratio wing plane having a bow or frontal control that has not been possible on other types of aircraft.

The lower part of the low aspect ratio wing is so designed that it will give a larger lift than heretofore possible and in a measure has the dynamic lift found in the biplane. Propelling means are so placed in the air passages which are recessed at the bow of the craft, that the air is allowed to pass in under the upper part of the airfoil in a manner which preserves the lift on the top of the lower part of the airfoil. Enclosing the fuselage in the lower part of the wing takes away the drag and permits of a streamlining not possible in the present day heavier than aircraft.

By offsetting the upper part of the airfoil, still greater lift is obtained and at the same time, a bow control is obtained that is far more positive than can be obtained at the rear of present day aircraft.

A further object of the invention is that in order to obtain the lowest landing speeds possible, the upper part of the low aspect ratio airfoil or wing is constructed to contain a constant lifting medium such as helium to sustain part of the gross weight thereby cutting to the lowest possible point, the aerodynamic lift necessary to support heavy loads.

Another object of the invention is that at the rear of the passages, the slipstream of the propellers in diffusing at the rear not only breaks up the parasite drag in the rear but aids to step up the boundary layer flow of air over the body thus giving the rear rudders more positive control and adding greatly to the stability at the rear.

A further object is that in flight, the rear elevators are made more positive in that they are placed at a point when the full power of the propeller slipstream plus the air through which the craft is passing can be used, thereby giving a greater control than any yet known or used in aircraft.

Another feature is that in a recess in the upper part of the wing, there is placed a conventional rudder and elevator the construction of which needs no explanation; however being located in this position and owing to the design of the airfoil, a positive control at the bow of the craft is provided thereby moving forwardly the turning axis nearer the center of the airfoil and thereby lessening the stresses on the entire craft.

Another object of the invention is to create an aircraft shape and design that will permit the craft being built for greater sizes and of greater carrying capacity than present day heavier than aircraft and yet the overall weights and landing speeds will not be increased nor controllability made more difficult. This is accomplished in this design by the use of helium to sustain part of the gross weight thereby lessening the landing and take off speeds while the bow control places the turning axis nearer the center of the craft thereby lessening the stresses.

The position of the propelling means permits of using the slipstream of the propellers for cutting down the frontal resistance, for breaking up of part of the parasite drag at the rear, and for giving a more positive control of the boundary layers of air around the aircraft thereby adding more speed and controllability to the craft.

The novel features which I believe to be characteristic of my invention are set forth with particularity in the appended claims. The invention itself, however, both as to its organization and method of use, together with additional aspects and advantages thereof, will be best understood from the following description of a specific embodiment when read in connection with the accompanying drawing in which, Fig. 1 is a vertical longitudinal sectional view of the aircraft.

Figure 1:
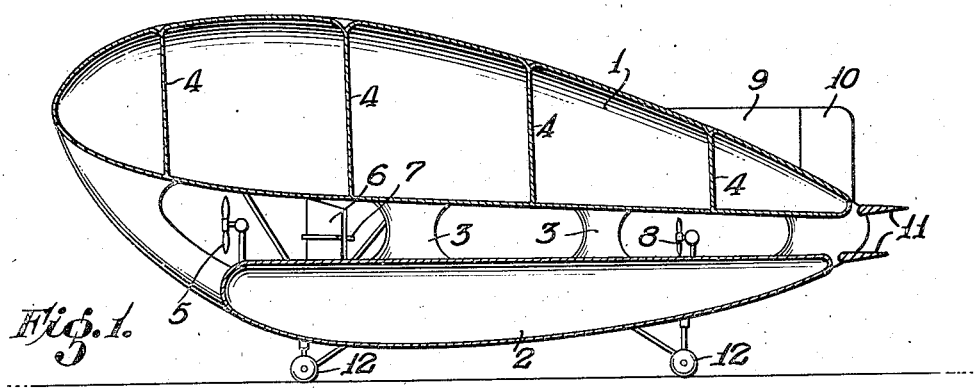
Figure 2:
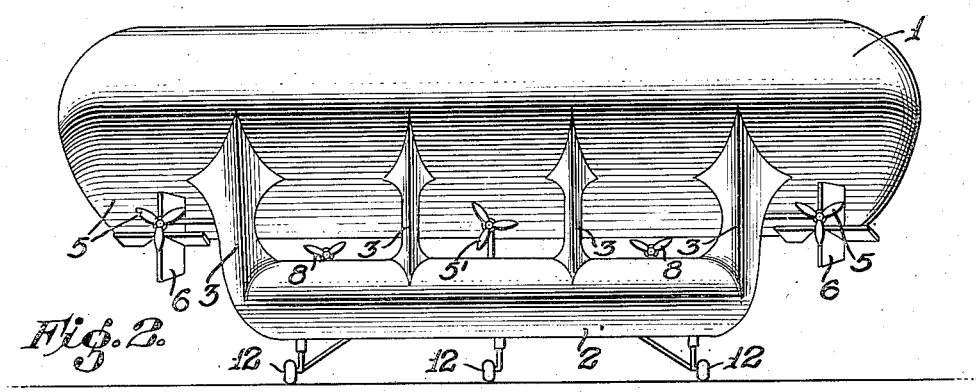
Fig. 2 is a front elevational view.
Figure 3:
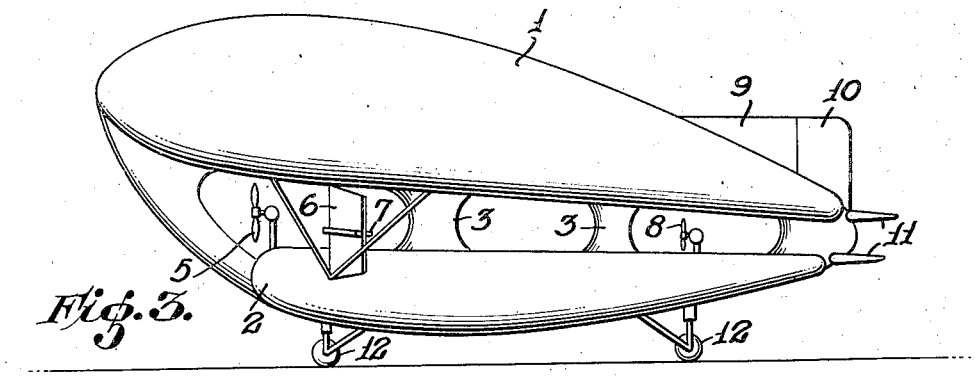
Fig. 3 is a side elevational view.

Referring to the drawing which illustrates the various principles involved in my invention, I provide a low aspect ratio wing having the middle longitudinal portion omitted so as to form an upper airfoil section 1 and a lower airfoil section 2 spaced from each other to provide an air passageway between them. The two parts are joined and held together by struts 3. The hollow upper part 1 is preferably divided by vertical partitions 4 into compartments for holding a gaseous lifting medium such as helium designed to take up from 10% to a much higher per cent of the gross load which enables the landing and take off speeds to be decreased and greatly increases the safety factor. The upper part 1 of the wing is offset with relation to the lower part 2 so as to have a greater dimension laterally, the ratio shown being about 1½ to 1. The fineness ratio is approximately 5 to 2. The lower part 2 of the wing is hollow for containing passengers and cargo. The construction of most of the craft including the two parts of the wing may be of any suitable material, preferably plywood.

Propelling means 5 is located near each extreme forward edge or corner between the upper part 1 and the lower part 2 to create an air current that will give lateral bow control to the craft and thereby decreases stresses on the rear thereof. Propelling means 5' is located forwardly and centrally in the air passageway between the upper and lower parts of the wing. Elevators 6 and rudders 7 are located near the forward end of the craft at opposite sides thereof and between the two parts of the wing. The rear portion of the craft is provided with propelling means 8. There are two of these, one at each side of the center line but considerably spaced therefrom and located in the air passageway. The rear portion of the craft is also provided with stabilizers 9, rudders 10 and elevators 11.

The operation and advantages of my invention will be apparent from the foregoing description in connection with the drawing. Many of the advantages have already been referred to. Due to the particular construction of a low aspect ratio wing and with part of the weight taken up by a constant lifting medium such as helium, many of the disadvantages inherent in the usual type of plane and in the dirigible are eliminated as previously noted in detail. At the same time, the advantages of both types are made of use and additional advantages obtained to which reference has already been made.

I claim:

1. A heavier than air aircraft consisting of an airfoil wing comprising upper and lower airfoil sections spaced apart to provide an intervening air passageway in the airfoil wing open at the front, back, and sides, the top surface of the upper airfoil section and the bottom surface of the low airfoil section being convexly curved throughout from front to rear and constituting the upper and lower surfaces of said airfoil wing, the trailing edges of the airfoil sections being substantially vertically spaced at the rear end of the air passageway, the chord and span of the upper airfoil section being greater than the chord and span of the lower airfoil section, whereby the upper airfoil section projects laterally beyond the lower airfoil section, struts connecting the upper and lower airfoil sections and spaced longitudinally and laterally of the airfoil wing, and propellers located wholly beneath the laterally projecting portions of the upper airfoil section.

2. A heavier than air aircraft consisting of an airfoil wing comprising upper and lower airfoil sections spaced apart to provide an intervening air passageway in the airfoil wing open at the front, back, and sides, the top surface of the upper airfoil section and the bottom surface of the lower airfoil section being convexly curved throughout from front to rear and constituting the upper and lower surfaces of said airfoil wing, the trailing edges of the airfoil sections being substantially vertically spaced at the rear end of the air passageway, the chord and span of the upper airfoil section being greater than the chord and span of the lower airfoil section, whereby the upper airfoil section projects laterally beyond the lower airfoil section, struts connecting the upper and lower airfoil sections and spaced longitudinally and laterally of the airfoil wing, propellers located wholly beneath the laterally projecting portions of the upper airfoil section, said propellers being located at the bow of the airfoil wing, and elevators and rudders located at the forward end of the airfoil wing in the slipstream of the said propellers.

3. A heavier than air aircraft consisting of an airfoil wing comprising upper and lower airfoil sections spaced apart to provide an intervening air passageway in the airfoil wing open at the front, back, and sides, the top surface of the upper airfoil section and the bottom surface of the lower airfoil section being convexly curved throughout from front to rear and constituting the upper and lower surfaces of said airfoil wing, the trailing edges of the airfoil sections being substantially vertically spaced at the rear end of the air passageway, the chord and span of the upper airfoil section being greater than the chord and span of the lower airfoil section, whereby the upper airfoil section projects laterally beyond the lower airfoil section, struts connecting the upper and lower airfoil sections and spaced longitudinally and laterally of the airfoil wing, propellers located wholly beneath the laterally projecting portions of the upper airfoil section, said propellers being located at the bow of the airfoil wing, elevators and rudders located at the forward end of the airfoil wing in the slipstream of the said propellers, and laterally spaced rear propellers located in the rear portion of the air passageway.

4. A heavier than air aircraft consisting of an airfoil wing comprising upper and lower airfoil sections spaced apart to provide an intervening air passageway in the airfoil wing open at the front, back, and sides, the top surface of the upper airfoil section and the bottom surface of the lower airfoil section being convexly curved throughout from front to rear and constituting the upper and lower surfaces of said airfoil wing, the trailing edges of the airfoil sections being substantially vertically spaced at the rear end of the air passageway, the chord and span of the upper airfoil section being greater than the chord and span of the lower airfoil section, whereby the upper airfoil section projects laterally beyond the lower airfoil section, struts connecting the upper and lower airfoil sections and spaced longitudinally and laterally of the airfoil wing, propellers located wholly beneath the laterally projecting portions of the upper airfoil section, said propellers being located at the bow of the airfoil wing, elevators and rudders located at the forward end of the airfoil wing in the slipstream of the said propellers, laterally spaced rear propellers located in the rear portion of the air passageway, and stabilizers, rudders, and elevators located at the rear end of the airfoil wing.

5. A heavier than air aircraft consisting of an airfoil wing comprising upper and lower airfoil sections spaced apart to provide an intervening air passageway in the airfoil wing open at the front, back, and sides, the top surface of the upper airfoil section and the bottom surface of the lower airfoil section being convexly curved throughout from front to rear and constituting the upper and lower surfaces of said airfoil wing, the trailing edges of the airfoil sections being substantially vertically spaced at the rear end of the air passageway, the chord and span of the upper airfoil section being greater than the chord and span of the lower airfoil section, whereby the upper airfoil section projects laterally beyond the lower airfoil section, struts connecting the upper and lower airfoil sections and spaced longitudinally and laterally of the airfoil wing, and propellers located wholly beneath the laterally projecting portions of the upper airfoil section, said air passageway being tapered from front to rear and the upper and lower airfoil sections having bowed frontal portions arranged to form a flaring entrance to said air passageway.

6. A heavier than air aircraft consisting of an airfoil wing having a fineness of approximately five to two and a ratio of width to length of approximately one to one and a half, said airfoil wing comprising upper and lower airfoil sections spaced apart to provide an intervening air passageway in the airfoil wing open at the front, back, and sides, the top surface of the upper airfoil section and the bottom surface of the lower airfoil section being convexly curved throughout from front to rear and constituting the upper and lower surfaces of said airfoil wing, the trailing edges of the airfoil sections being substantially vertically spaced at the rear end of the air passageway, the chord and span of the upper airfoil section being greater than the chord and span of the lower airfoil section, whereby the upper airfoil section projects laterally beyond the lower airfoil section, struts connecting the upper and lower airfoil sections and spaced longitudinally and laterally of the airfoil wing, and propellers located wholly beneath the laterally projecting portions of the upper airfoil section.

GARRETTE W. PECK.